Dec. 13, 1932.  G. S. NEELEY  1,891,004
MEANS FOR PREVENTING SCALING AND CORROSION OF METAL UNITS
Filed Aug. 12, 1929  3 Sheets-Sheet 1
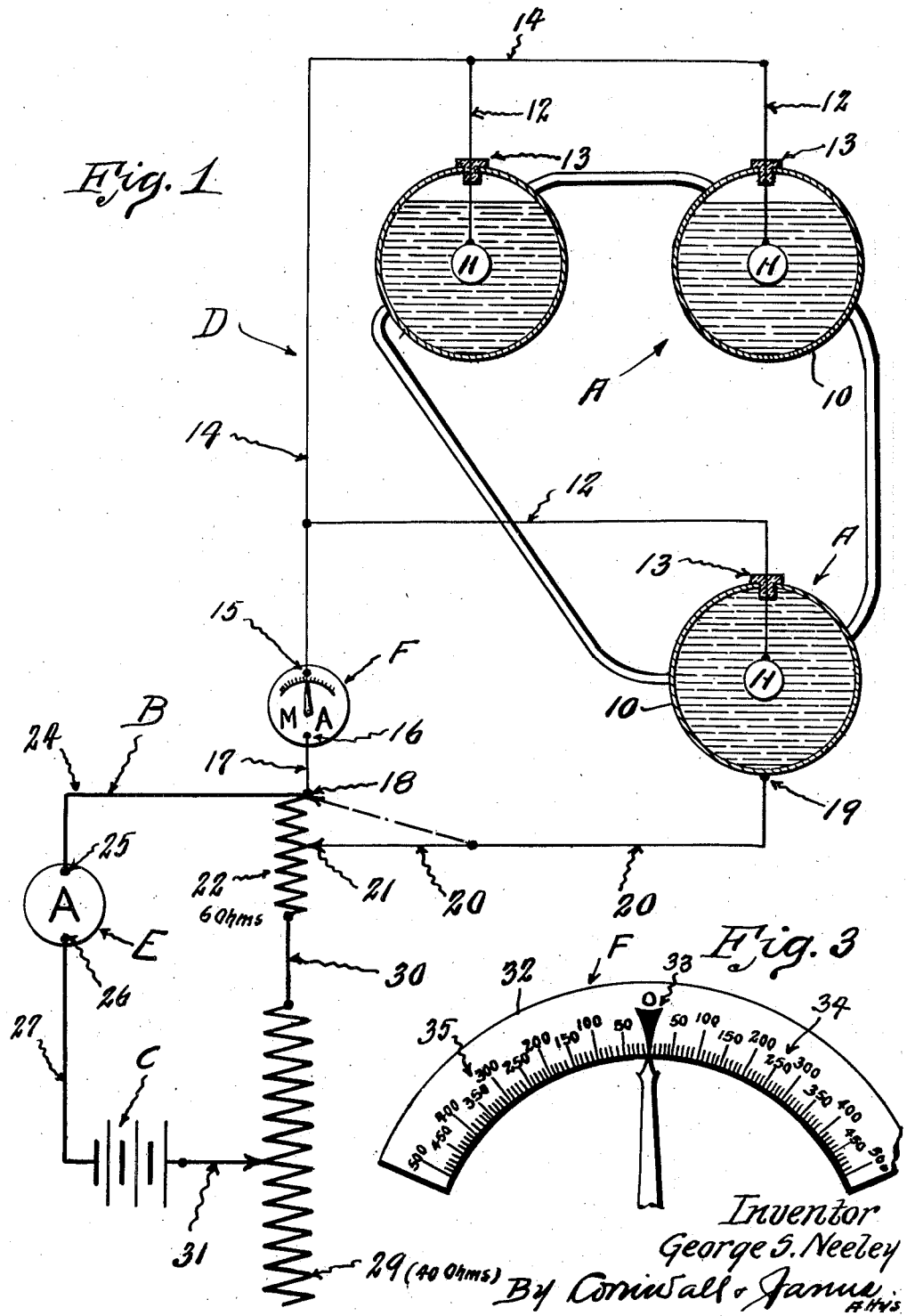
Inventor
George S. Neeley
By Cornwall & Jannes
Attys

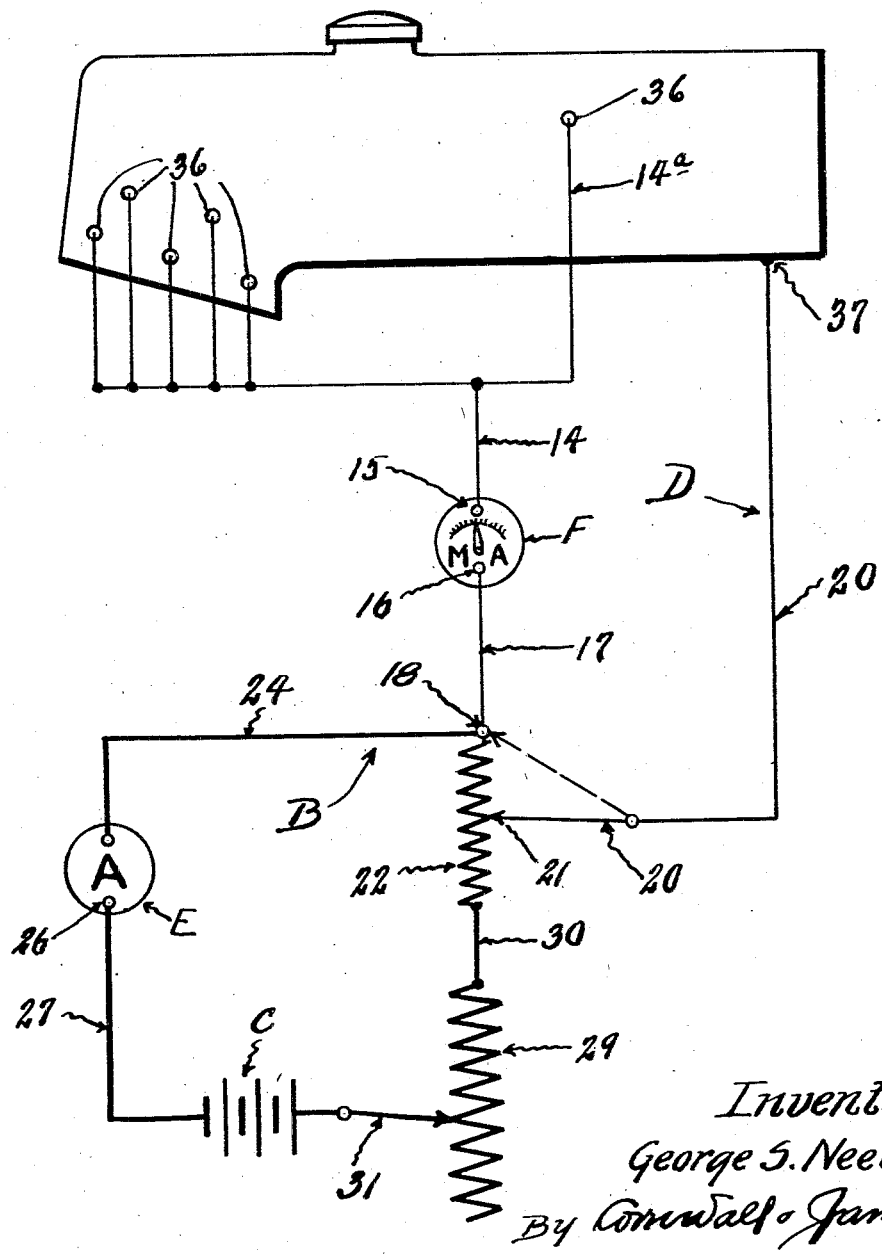

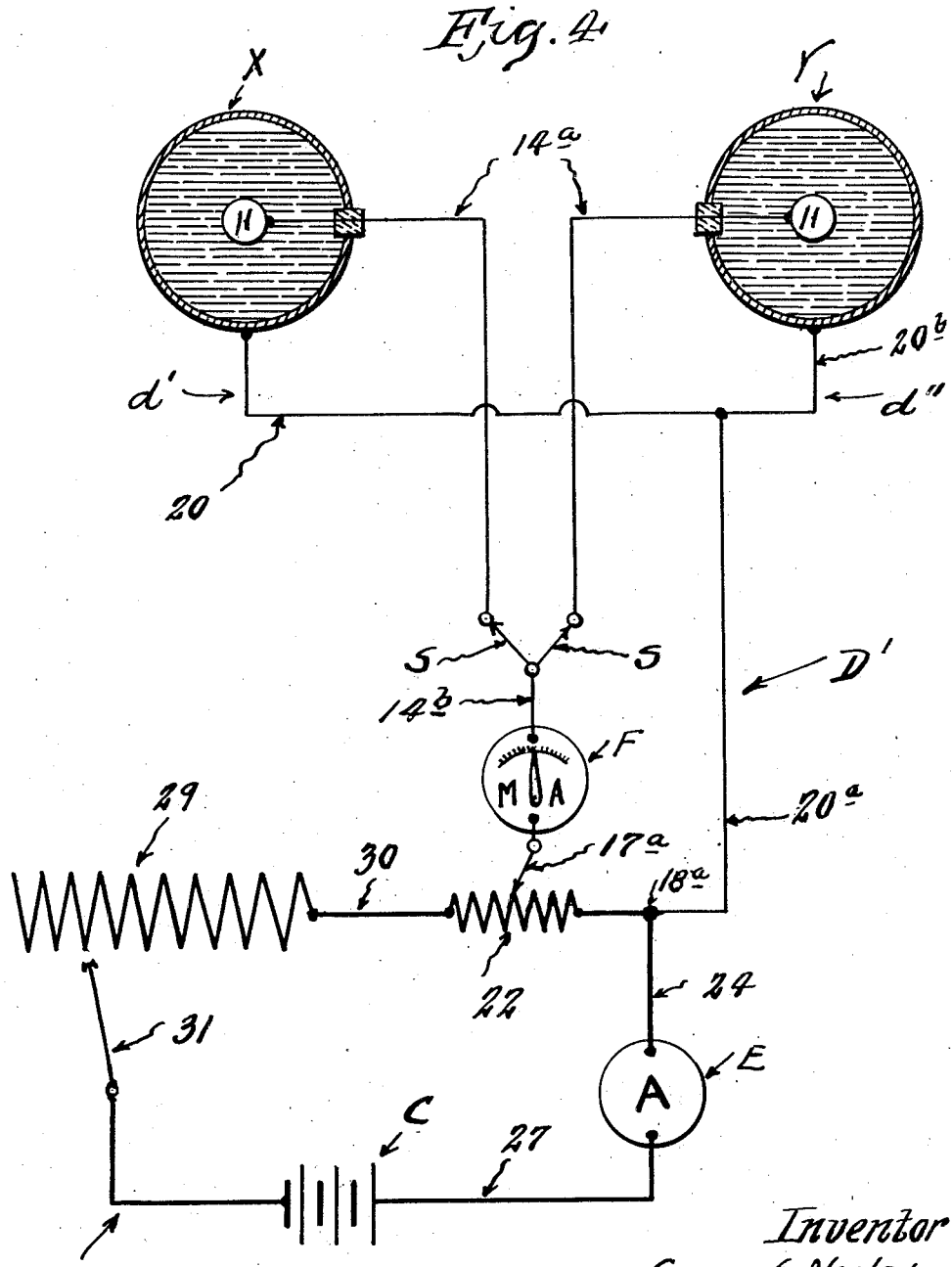

Patented Dec. 13, 1932

1,891,004

UNITED STATES PATENT OFFICE

GEORGE S. NEELEY, OF HARTFORD, ILLINOIS, ASSIGNOR OF ONE-HALF TO GRIFFIN WATKINS, OF ALTON, ILLINOIS

MEANS FOR PREVENTING SCALING AND CORROSION OF METAL UNITS

Application filed August 12, 1929. Serial No. 385,149.

This invention relates to a novel method of protecting metallic units against corrosion and scaling produced by electrolytic action by stray or self-generated electric currents, and to new means for practicing said method.

The present invention is an improvement upon the invention described in my copending application filed June 12, 1929, Serial No. 370,230.

The method to which the present invention appertains utilizes an external source of electric potential to counterbalance and neutralize the self-generated or stray electric current which is responsible for the scaling and corrosion of the metallic units, which units complete the circuit of such current.

Scaling and incrustation is particularly formed during the operation of boilers, condensers, and other devices containing liquid and subjected to a high degree of temperature. Corrosion and pitting is caused by the self-generated or stray electric currents which utilize the unit as part of the circuit.

The primary objects of this invention are to provide an efficient method of first ascertaining the polarity and the magnitude or amperage of the destructive electric current and then applying a counter electromotive force of opposed polarity and of sufficient strength to obtain a statical balance of forces in the unit to be protected.

Further objects of the invention are to provide a novel method of regulating the applied or counter electromotive force so as to render it of sufficient magnitude to stop the flow of the destructive current whereby the latter is counteracted by obtaining a statical balance of forces.

Still further objects of the invention are to provide efficient and inexpensive means for carrying out this novel method in a simple and practical manner.

Other objects of the invention are to provide an inexpensive means of using a direct electric current to apply a suitable electromotive force to the unit to be protected and a simple and positive means of regulating this electric potential for the purpose of counteracting the thermo-electric current of said unit.

Still other objects of the invention are to provide a primary circuit including a source of direct electric current and to provide an instrument for indicating the direction of flow and the value of said current and a resistance for regulating the strength of the latter, and to provide a secondary or shunt circuit having its respective terminals connected to the shell of the boiler or unit to be protected, and to a distributor immersed in the water content of said unit and insulated from said shell, said secondary circuit being adapted to be shunted around the resistance in said primary circuit whereby an external electric potential is applied to said secondary circuit in opposed polarity to that of the self-generated current of the unit.

Additional objects of the invention are to provide a primary resistance in said primary circuit for initially regulating the value of the current drawn from the battery and source of supply, and to provide a secondary resistance in said primary circuit in series with the aforementioned resistance and cooperating with one of the terminals of said secondary circuit to regulate the value of the counteracting potential applied to said secondary circuit, and to provide a suitable instrument for reading the strength of the current flowing therethrough and for indicating when an exact statical balance is obtained.

All boilers, condensers, feed water heaters, fed water lines, and, in fact, all units which contain an aqueous liquid at a higher temperature than the surrounding atmosphere operate to generate an electric current on the principal of the well-known thermo-couple. These thermo-electric, or thermo-dynamic currents are expended in the building up of scale deposits on the internal surfaces of the units, which latter are electrically "cathodic" by the simple process of electro-plating the salts of calcium and magnesium on said internal heating surfaces. These salts when thus plated become hard scale under the action of high temperature.

Again these thermo-dynamic currents set up "anodic" poles in some parts of said units with the direct result that "pitting", "corrosion," and "embrittlement" of the metal parts take place at these anodic poles. Thus it will be seen that in the case of embrittlement these thermo-dynamic currents are of sufficient magnitude to be very destructive.

It might now be well for us to explain that in the case of building up of scale deposits in steam boilers the process is one of simple electro-chemical action in which these thermo-currents literally take the salts of magnesium, calcium, silica, iron, etc., out of solution in accordance with well-known electro-chemical laws and electro-plate these salts on the internal heating surfaces of the boiler where they come in contact with surfaces of high temperatures and in combination with electro-chemical processes change into hard scale at about 800 degrees Fahrenheit.

The crux of the whole matter of inhibiting scale, corrosion, pitting, incrustation, and embrittlement of the metal of the shell plates or containers by destructive electrical currents. is to know beforehand the extent or values of the strengths of these destructive electric currents in terms of electrical measurement which are exact, and to apply an external electric potential of sufficient magnitude and of proper polarity to stop the flow of this thermo-dynamic current. Thus the thermo-dynamic electric current is counterbalanced, or neutralized, so that it no longer can exert any electro-chemical action upon the salts contained in the water, thereby eliminating the electro-plating action.

Later knowledge obtained of these destructive thermo-dynamic electric currents prove in a very conclusive manner that the value of these currents is not the same in any two boilers or containers, although the latter may be of the same size and type. The reason for these differences will be found to lie in the difference in the atmospheric and temperature conditions which surround these units. Thus, for instance, no two boilers can be bricked up so that their draft conditions will be exactly identical.

As stated before, scale deposits are built up by an electro-chemical process similar to electro-plating and the scale matter thus plated is turned into hard scale by the heat applied to the boiler. This cyclic plating and heating operation is gone through with so regularly that heavy scale deposits are the result in every case where nothing is done to circumvent this destructive electro-chemical action. Neutralization of these thermo-currents will inhibit or prevent the building up of scale deposists when practiced according to my method of establishing a statical condition of these thermo-currents.

Again, pitting, corrosion, and even embrittlement of boiler plates and other units is now known to be the direct result of the destructive electrical effects of these thermo-currents. It can be proven in each instance that these points, where destructive effects are noted, are electrically "anodic" or positive in character. With this electrical condition definitely established, it is then easy to see the reason for the destructive electrical action at these points, for it is a well-known fact that the positive poles of any electrolytic action produce destructive and disintegrating effects on the iron "anodes" of the system.

Bringing about a statical balance of the thermo-currents at these points in a working boiler or other unit will stop all destructive electrolytic action and this statical balance condition can be readily accomplished by the use of my novel method.

The first step in the practice of my new method is to obtain accurately, by actual electrical measurements, the magnitude and polarity of the thermo-electric current of the unit to be protected. With this information I then apply to said unit a counter or opposing electrical force of proper magnitude so that all of the normal and destructive effects of the thermo-electric activity of the unit are completely brought under control through the process of electrical neutralization by establishing a state of statical electrical balance of the electrical forces.

Any one skilled in the art and use of opposing electrical forces knows that this condition when once reached is a balanced or statical condition resulting from bringing together equal and opposing electrical forces and further that there will be no resultant electrical action, either destructive or constructive, so long as this balanced condition is accurately maintained.

Referring now to the accompanying drawings, which indicate a practical embodiment of my invention,—

Figure 1 is a diagrammatic view showing my invention applied to a boiler.

Figure 2 is a similar view but showing a modified form as applied to a locomotive boiler.

Figure 3 is a detail view of the chart used in the measuring instrument.

Figure 4 is a diagrammatic view showing another modified form of my invention.

Referring by reference characters to the accompanying drawings, A indicates a unit which is to be protected, B the primary circuit including a source of electric energy C, and D indicates a secondary circuit in which the unit A is included. The primary circuit contains an ammeter E and the secondary circuit contains a balancing milli-ammeter F.

In the instant case, the unit A is in the form of a boiler having three drums 10. A distributor 11 is arranged in each drum 10 and is spaced from the metal shell thereof. This distributor is immersed in the water content of the boiler, preferably at points known to be electrically positive. Leading from each distributor 11 is an electrical connection 12 which extends outwardly through the shell of the boiler or drum and is insulated therefrom as indicated at 13. Where more than one drum is used, each of these connections 12 is connected to a line 14 which is connected to a terminal 15 of the balancing milli-ammeter F. The other terminal 16 of this ammeter is connected by a wire 17 to a contact member 18. The shell of the boiler 10 has connected thereto at 19 a connection 20, the other end 21 of which is free to operate over a resistance 22 and also to engage contact member 18 as shown in dotted lines in Figure 1. One end of this resistance is connected to a contact member 18 and when said free end 21 of connection 20 engages said member 18 the secondary circuit D, just described, is closed, the resistance 22 being cut out.

Contact member 18 has connected to it one end of a connection 24, the other end of which connection engages a terminal 25 of ammeter E. The other terminal 26 of this ammeter is connected by a connection 27 to one pole of the source of electrical current C which in the present instance is in the form of an ordinary dry cell. A variable resistance 29 of approximately 40 ohms is connected by a connection 30 in series with resistance 22, which latter is of approximately 6 ohms. A connection 31 is connected to the other pole of battery D and has its free end adjustable over resistance 29 so as to vary the strength of the current supplied by said battery.

It will be noted that resistance 22 constitutes a potentiometer by means of which varying potentials may be impressed upon the secondary circuit D. The resistance 29 enables an adjustment of the current flow from source C through the primary circuit, while potentiometer 22 enables an adjustment of the portion thereof whose voltage drop is included in circuit D.

When the connection 20 engages contact member 18 the current supplied by the battery C is shut off from the secondary circuit traveling only through the primary circuit. Also the secondary circuit is closed, thereby permitting the thermo-electric current to travel through the secondary circuit. The magnitude of this current can be ascertained by reading the milli-ampere instrument F.

This instrument is a double reading or balancing milli-ammeter and is so arranged as to measure electric currents of opposed polarities, the zero or neutral point being located in the center. The reading chart 32 has a centrally disposed zero mark 33 and oppositely disposed graduations 34 and 35 graduated to read from zero to 500 milli amperes. Thus one side of the chart is used to read the thermo-electric current generated by the unit while the other side of the chart is used to measure the external applied current shunted from the primary circuit through said secondary circuit.

After the strength and direction of flow of the thermo-electric current is ascertained by means of instrument F, connection 31 of the primary circuit is adjusted so as to regulate the strength of the external current relatively to said thermo-electric current, and, if necessary, changes are made in the connections so as to cause the external current to be of opposed polarity relatively to said thermo-electric current.

Connection 20 is now moved over the resistance 22 in order to cause the external or applied potential from the primary circuit to attain such value that a statical balance is obtained to stop the flow of the thermo-electric current.

For the efficient operation of the invention it is desirable that an electrical balance be obtained so that no electrical activity can take place in the boiler or the unit to be protected. To obtain this perfect balance, connection 20 is adjusted over the resistance 22 until the indicator of the balancing instrument F occupies central or zero position. There are two resistances 22 and 29 provided in the primary circuit in order to provide a greater range of adjustments. Resistance 29 of 40 ohms capacity is used to provide initial adjustment and resistance 22 of 6 ohms capacity is used to provide the final adjustment.

The source of the external electric current is preferably a standard dry cell battery as this is well adapted for this class of work and at the same time is inexpensive and safe to use.

It has been found in practice that no boiler condenser or the like ever generates an electrical potential over 700 milli amperes or a voltage over 500 milli volts. This fact alone definitely fixes the origin and source of these troublesome electric currents as being of thermo-dynamic electric origin. If the source of these currents were of galvanic or electro chemical origin their voltage would be co-equal with that of the average chemical cell which is known to be anywhere from one and one-half to two and one-half volts.

This enables me to use a single chemical cell as a source of counter electric current as any standard dry cell is capable of giving off from 30 to 40 standard ampere hours at a voltage ranging from one and one-half to two and one-half volts. The actual requirements in any case for counter electrical action is not over one standard ampere and one volt. Thus it will be seen that a standard dry cell battery can be used as the source of counter current for periods of from two to three months without renewal.

While it would seem that the basic princ'ple of my invention is the balancing of an external electromotive force against an internal electromotive force, I prefer not to commit myself definitely upon the theory involved, since the exact happenings inside a boiler are by no means definitely and conclusively settled. It might well be that forces other than electromotive forces, such for example as electromagnetic forces, are actually balanced to stop the injurious current flow. Since the water element in a boiler is of negative polarity while the metal surfaces are of positive polarity, it is conceivable that a magnetic structure might actually exist and electromagnetic forces might be involved. Therefore, it is to be understood that no limitation is to be imposed upon my invention by any conceivable theory.

In the modified form shown in Figure 2, my invention is shown as applied to a locomotive boiler. The connection 14 of secondary circuit D is connected by a series of branches 14$^a$ to distributors (not shown) which are secured to wash-out plugs 36. These plugs are of standard construction and are part of the boiler construction so that no additional installation work on the boiler is required. Each plug is arranged to receive an electrode and hold it in spaced insulated relation with the boiler. The other terminal of the secondary circuit is connected to the shell of the boiler as indicated at 37. The primary circuit B is the same as in the preferred form.

Thus with my improved method applied to a locomotive boiler treatment is afforded without the necessity of operating regular lighting equipment, to furnish the current, during daylight hours or when the locomotive is laid up in the roundhouse, or on siding, with the steam up. This feature alone insures greater efficiency in preventing scaling and pitting, as there are a great many hours when these conditions occur and when the generating apparatus could be profitably shut down. The use of dry cell batteries, made possible only in my method, is a great advantage over other systems wherein the regular lighting equipment of the locomotive is used to furnish the current for the prevention of corrosion and pitting.

As stated before, the main resistance 29 is used for regulating the amount of current drawn from the dry cell battery C and has a resistance of approximately 40 ohms. The secondary resistance 22 is connected in series with the main resistance 29 and has resistance of about 6 ohms. This secondary resistance is used to provide the adjustment of the external potential applied to circuit D to obtain the desired statical balance to stop the flow of the thermo-electric current. When connection 20 is moved into engagement with the resistance 22, the secondary circuit is connected to the primary circuit B around this secondary resistance in shunt relation thereto. This arrangement causes a potential, proportional to the manual setting of connection 20 relatively to resistance 22, to be applied to the secondary circuit. Thus the closer the point 21 of circuit 20 is to contact member 18 the fewer the number of turns of resistance 22 is included in the secondary circuit and an electric potential of proportionately lesser magnitude is applied to the said secondary circuit. As the point 21 is adjusted away from contact 18 and toward resistance 29 the effective capacity of resistance 22 increases and the magnitude of the external potential applied to said secondary circuit also increases.

This unique arrangement of regulating resistance permits of two major advantages, besides affording a micrometer adjustment of the current taken out of the battery for balancing purposes. The first of these advantages is (1) that the value of the potential applied to the secondary circuit builds up with the same ratio at which the resistance is increased and vice versa; and (2) that as the value of this six ohm secondary resistance is decreased to the zero point, as a resistance, it allows the thermo-electric current from the boiler to preponderate without hindrance, and on this account will show the true value of the thermo-current as to its total value, by a direct reading on the balancing milli-ampere meter which is always included as a part of this shunt circuit to give a visible and positive reading of the condition of electric balance that is being maintained to stop the flow the thermo-electric currents of the boiler or other unit to be protected.

In Figure 4 my invention is shown as applied to two boiler units X and Y, the secondary circuit D' being split up in two branches d' and d''. The connections 14$^a$ of each branch circuit are connected by means of switches S to a connection 14$^b$ which is connected to one terminal of a balancing milli-ammeter F. The other terminal of this instrument is connected to a connection 17$^a$ which is adjustable over the secondary resistance 22 of primary circuit B. This primary circuit is similar to the primary circuits of the preceding form, having a source of electrical current C, an ammeter E, and a primary resistance 29. The connection 20$^a$ having branches 20$^b$ connected to the shells of the boiler is connected to a post 18$^a$ which forms the terminal of the secondary resistance 22. By means of this arrangement, two or more boiler units can be protected by a single protective installation. Switches S are interposed in the secondary circuit for convenience, and can be dispensed with if desired. In the event one of the units is shut down, and water is drained from the boiler, the circuit of such particular unit is interrupted and no electric current can flow therethrough. So long as water is contained in the boiler there is a possibility of electric current, either self-generated, or stray, traversing the water content and the metal shell, and it is advisable to leave the circuit closed.

The balancing instrument F indicates at all times whether or not the objectionable currents are flowing. When a balanced condition obtains, ammeter E indicates such condition.

So long as thermo-electric current from the boiler is counteracted, the condition of which is always indicated by a zero reading of the milli-ampere meter, there is no scale formed, nor will there be any pitting of the boiler plates or tubes, for these reasons; the normal thermo-electric currents of the boiler being stopped and an exact statical balance being obtained in accordance with the practice of this method, there is no electrical agency for removing the calcium and magnesium salts from solution out of the boiler water, and further, to electro-deposit these same salts on the interior of the heating surfaces of the plates and tubes, where they will readily go into hard scale at about 800 degrees F. Again, there will not be any differences of electrical potential set up anywhere in and about the unit, where anodic poles can be formed, as such statical balance of electrical forces produces an equalization of all electrical polarity, thus doing away with all anodic and cathodic areas, thereby preventing electro-chemical corrosion, pitting and embrittlement.

The greatest advantages accrue from an accurate equalization of the thermo-electric activity in and about the boiler unit to be protected. When the thermo-electric currents are at a statical equalization or rest, scale, pitting, corrosion and embrittlement are inhibited at the same time and by the same operation because of the fact that it is the positive or anodic element in the thermo-electric current that initially removes the salts of calcium, magnesium, silica, and all other scale forming chemical elements, as heat alone is not sufficient to remove these scale forming salts direct from solution in the boiler water. It is not only the activity of these thermo-electric currents in removing these scale forming salts direct from solution, but it is the same agency that is further responsible for their beautiful electro-depositing on all internal heating surfaces, which are all electrically cathodic, and where these same salts go into hard scale at about 800 degrees F. just as is their natural tendency to do.

Again, when the thermo-electric currents are accurately balanced out, or put at statical rest, all anodic poles in and about the unit to be protected are equalized and thereby done away with, which fact further and effectually inhibits all forms of electrolysis for this simple reason; there are now under this balanced condition no differences of electrical potential in and about the unit to be protected as long as this state of electrical equilibrium of forces obtain. It is in the foregoing manner in which scale, pitting, corrosion and embrittlement is inhibited through the scientific equalization of all of the thermo-electrical forces in and about the boiler unit, which is by means of exact electrical opposition of these thermo-electric forces at all times when the boiler unit is in operating service.

If a counter electric current is applied to the boiler unit in a quantity greater than that necessary to balance out the thermo-electric current of the boiler, this same counter electric current is then more effective in building up scale deposits than would be the natural and normal thermo-electric current if left to itself.

This adverse action is more noticeable in the patents to Cumberland and Gunderson wherein they attempt to stop corrosion of the boiler plates which is of electrolytic origin, by the application of a counter current of such magnitude that it overwhelms the activity of the thermo-electric current in its destructive electrolytic activity, by literally driving it back into the anodic areas with a current of so much greater magnitude than what is really needed. Mr. Gunderson says a great deal about the plating out of "arsenic" onto all cathodic surfaces, but he fails to say anything about the calcium and magnesium together with all the rest of the scale forming chemical elements that are just as susceptible of being "plated out onto all cathodic surfaces" as is his "arsenic". Hence, with this unbalanced type of counteraction, you may reduce the destructive electrolytic effects of pitting and corrosion but you increase the scale building propensities in the same ratio.

With the exact balancing out of the troublesome thermo-electric currents in any boiler or kindred unit, as practiced in my method of producing a statical condition of the electrical forces, in and about the unit to be protected, there will be no scale formed as there will be no electrical agency in the combination with this exact balance of forces, to remove the chemical salts of calcium and magnesium from solution; consequently they will stay where they always were, as heat alone is not sufficient to remove them initially from solution, neither will there be any destructive electrolysis or electrolytic action for the same reason.

My novel method enables the use of means which is safe to handle and is absolutely free from danger of electric shock, because the electric current employed is of such insignificant voltage that injury is impossible.

No switches are necessary in controlling the circuits. This precludes the possibility of any meddling by unauthorized persons, who might, either accidentally or purposely, leave a switch open, when it should have been closed.

Another great advantage of my method is its efficiency. Only the exact amount of counteracting electric current is used and no more. This permits the use of standard dry cells for an average of about three months on one standard cell, before renewal is necessary. As the cost of dry cells is very small (about thirty cents a piece wholesale) the cost of operating my method is very little since the replacement of exhausted cells is the only operating item.

The collecting and distributing anodes do not disintegrate in this system through electrolysis, as is the case in other systems, because these anodic elements are at all times, under normal operating conditions, subjected to a state of balanced electrical condition. Consequently this state of condition corresponds to the zero point or relation, between the positive and negative cycle of an alternating current. Thus in theory as well as in actual practice, during the continuance of this state, no electrical action of any character can take place.

An important advantage of my method resides in the great efficiency and protection it affords. It prevents scale, pitting, corrosion, embrittlement, and, in fact, it prevents in one operation electrolytic action of every kind and character. This is accomplished by simply balancing out all electrical activity by the use of a counter electromotive force of suitable character and magnitude.

My improved method and means for practicing the same is adapted for use in all instances where it is desired to protect a unit, or metallic object, from the electrolytic action by electric currents, whether they be self-generated, or stray currents, and the method is efficient equally as well where the electrolytic action results in corrosion and pitting as in scaling and incrustation.

I claim:

1. A system for stopping undesired electrolytic action in a heated fluid-containing metallic body caused by current flow set up by an internal force within said body, comprising a source of electromotive force, means for deriving an adjustably variable electromotive force from said source, means for applying said variable electromotive force to said body in opposition to said internal force, whereby a statical balance of opposed forces may be obtained to prevent current flow within said body, and indicating means continuously in circuit with said body and said means for continuously indicating any current flow within said body due to said internal force, whereby the statical balance of forces may be preserved as long as said body is in operation.

2. A system for stopping undesired electrolytic action in a heated fluid-containing body caused by current flow set up by an internal force within said body, comprising a source of electromotive force, a potentiometer connected to said source, whereby an adjustably variable electromotive force may be derived from said source, and means connecting said potentiometer to said body so as to apply said variable electromotive force thereto in opposition to said internal force, whereby said potentiometer may be adjusted to cause said applied electromotive force to exactly equal said internal force to prevent current flow within said body.

3. A system for stopping undesired electrolytic action in a heated fluid-containing body caused by current flow set up by an internal force within said body, comprising a source of electromotive force, a potentiometer connected to said source, whereby an adjustably variable electromotive force may be derived from said source, means connecting said potentiometer to said body so as to apply said variable electromotive force thereto in opposition to said internal force, whereby said potentiometer may be adjusted to cause said applied electromotive force to exactly equal said internal force to prevent current flow within said body, and indicating means continuously in circuit with said body and said potentiometer for continuously indicating any current flow within said body due to said internal force, whereby the statical balance of forces may be preserved as long as said body is in operation.

In testimony whereof I hereunto affix my signature this 1st day of August, 1929.

GEORGE S. NEELEY.